Feb. 12, 1929.  1,701,919
O. F. A. E. GRUMPELT
METHOD AND ROTATING DISK FOR CUTTING METALS
BY THE AID OF AN ELECTRIC CURRENT
Original Filed Feb. 17, 1925   2 Sheets-Sheet 1
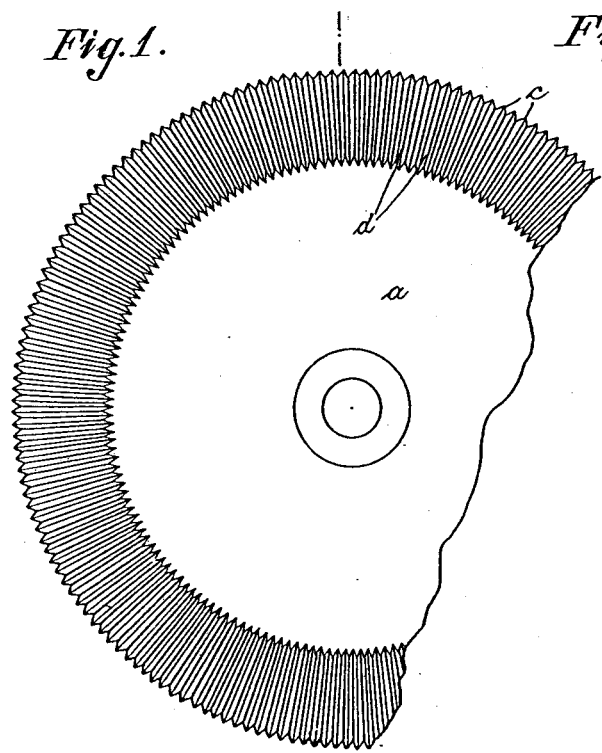
Fig.1.    Fig.2.
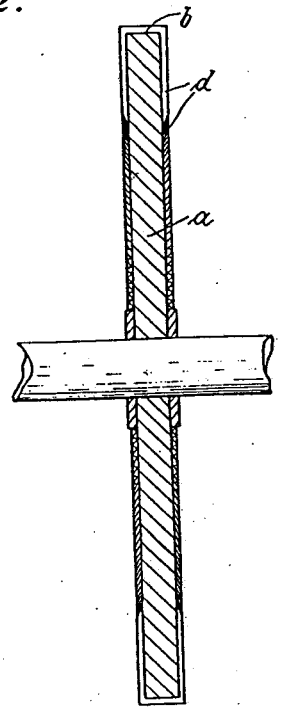
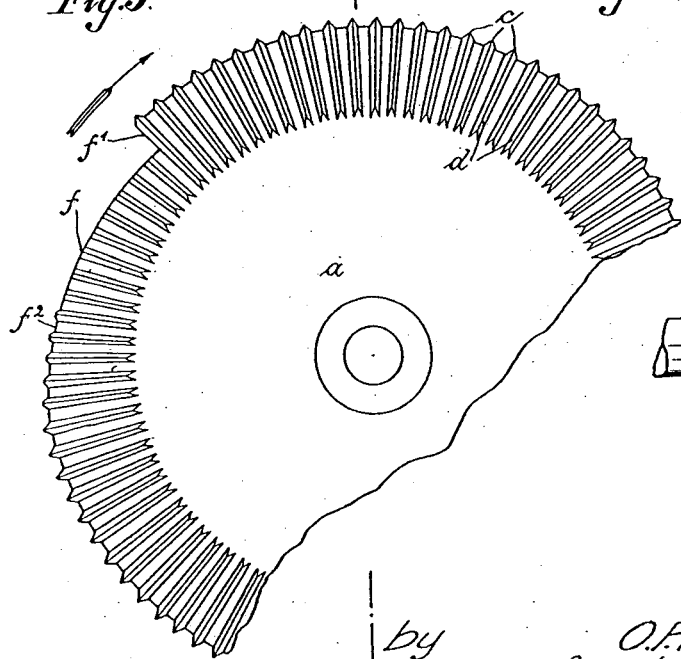
Fig.3.   Fig.4.   Fig.5.
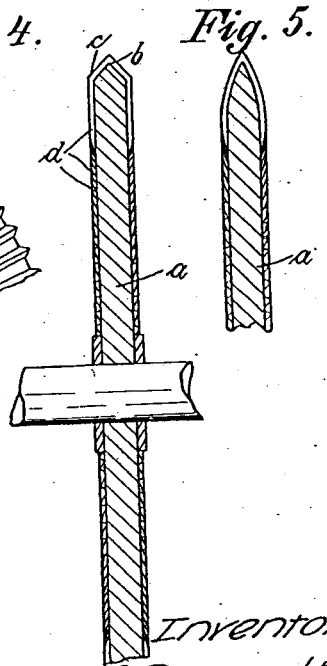
Inventor
O.F.A.E.Grumpelt
by
Langner, Parry, Card & Langner Attys.

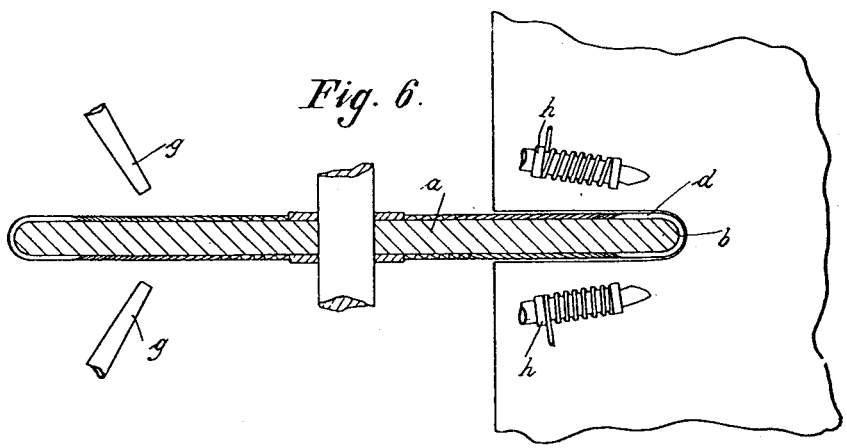
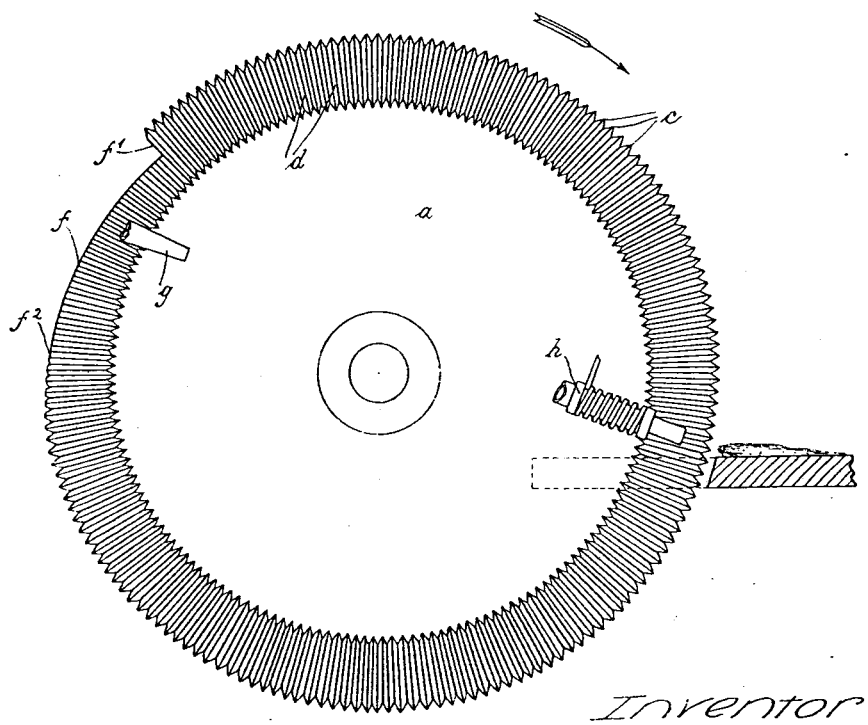

Patented Feb. 12, 1929.

1,701,919

UNITED STATES PATENT OFFICE.

OSKAR FRITZ AMANDUS EMIL GRUMPELT, OF HAMBURG, GERMANY, ASSIGNOR TO ELEKTROTRENNMASCHINEN GESELLSCHAFT MIT BESCHRANKTER HAFTUNG, OF HAMBURG, GERMANY, A FIRM.

METHOD AND ROTATING DISK FOR CUTTING METALS BY THE AID OF AN ELECTRIC CURRENT.

Application filed February 17, 1925, Serial No. 9,863, and in Germany January 12, 1925. Renewed December 28, 1928.

The problem of practically cutting metals by the aid of an electric current has not been solved up to date. Even rotating disks have been used in connection with this problem however, without practical or economical success.

By repeated investigations I have found out that the cutting of metals by the aid of an electric current can only be practically and economically carried out by adopting such measures as to produce a powerful electric arc, which is made to travel along the line of the metal to be cut. For producing such powerful electric arc an electric current of very low voltage and comparatively high amperage is used, the effect being to consume the metal by combustion on the line along which the arc is directed. The efficiency of such electric arc is increased by causing it to fluctuate rapidly, and a greater efficiency is obtained by causing still greater fluctuation of less frequency in addition to those of high frequency.

The most convenient way of carrying this method into effect is to make use of a high-speed-rotating serrated disk such as is called in Germany "Schnellreibsäge", that is a disk which rotates at a peripheral speed of about 120 m. per second and was supposed to cut the metal solely by the frictional contact of its smooth sharp edge. I provide such a disk with teeth and subject it while rotating to a current of low voltage and comparatively high amperage in such a way that a powerful electric arc is produced between the metal to be cut and the disk moving relatively to the metal and this arc is produced shortly before the metal on approaching the disk is able to actually contact with its edge, the temperature of the arc being so high that a lineal consumption of the metal results.

In the drawing disks are shown constructed according to the invention.

Fig. 1 is an elevation of a cylindrical disk toothed at the edge the teeth being continued a short distance on the sides of the disk.

Fig. 2 is a section of the disk shown in Fig. 1.

Fig. 3 is a similar elevation as Fig. 1 of of a modified disk, and

Figs. 4, 5 and 6 are sections of three modifications.

Fig. 7 is the elevation of a disk, shown in connection with several appliances adapted to increase the efficiency.

In the construction shown in Figs. 1 and 2 the disk $a$ has a square edge $b$. The teeth $c$ are provided not only across the edge but are also continued as at $d$ on the sides of the disk for a short distance. These teeth are preferably not cut into the material of the disk but are cut into an elevated rim so as to at least rise from the faces of the disk, or in other words the bottom of the spaces intermediate of the teeth may be flush with the sides of the disk.

These teeth not only have the advantage of compelling the electric current and thus the electric arc to fluctuate rapidly, but also to cast off any scorification that may be formed on the line of consumption with greater surety, so as to keep the surface bright. Thus the efficiency is increased by these teeth in two respects.

Instead of giving the disk a square edge, as shown in Fig. 2, it may be bevelled on one or both sides or rounded off at the edge, as shown in Figs. 4–6. In Fig. 4 the edge is bevelled to a V cross-section, and in Fig. 5 the disk is somewhat rounded off at the sides, while in Fig. 6 the edge itself is rounded off. In all cases the teeth will be formed corresponding to the shape of the edge. Disks reduced in thickness at the edge, as described, will be very efficient.

For producing greater fluctuation of the electric arc by breaking up the current at intervals the disk may be provided with gaps $f$ at one or more places on the circumference of the disk, the gaps having an abrupt shoulder $f'$ on one end and merging gradually into the circumference of the disk at the other end $f^2$. These interruptions are extraordinarily favorable for the formation of the arc, and when the arc is formed cause comparatively great fluctuations which, though following one another less rapidly than those created by the teeth $c$, yet nevertheless follow closely on account of the great speed of the rotating disk.

The peripheral speed of the disk is about 120 m. per second or 23622 feet per second and even greater, the limit being such as to prevent the disk from being torn to pieces by centrifugal force. The effect of this high circumferential velocity of the electrode, as has been fully set forth in my Patent No. 1,556,325 granted October 6, 1925, is to accelerate the combustion of the metal fused by the electric arc, since the electrode carries along with it a continuous current of fresh air and thus supplies oxygen at the work point, causing an actual burning up of the fused metal, so that the electrode by its rotation, flings away only the products of combustion or oxides. The electric arc must be powerful, and this is guaranteed by using an electric current of very low voltage, say .2 V. to 10 V., and of comparatively high amperage, which may vary between 10 to 400 times the voltage, depending on the thickness and hardness of the metal to be cut. Thus by cutting a plate of 18 mm. thickness an electric current of 1 V. and 200 A. will be required. If several places of an article are cut at once, the requisite amperage will have to be multiplied accordingly.

The heat developed by the means stated above vary between 2000° and 6000° centigrade. Thus it is evident, that a real consumption of the metal takes place, whereby the disk itself does not effect the cutting action but only conducts the electric current for producing the electric arc.

On account of the great heat developed by the means described above, it appears advisable to cool the disk by projecting a cooling liquid against it. This is done by a nozzle or pipe $g$ directed towards the disk at a point opposite the cutting point. Preferably a liquid such as a solution of soda or potash is used, because such liquids give off oxygen in the presence of heat. The oxygen particularly, when the pipe is properly directed, is led towards the place where the electric arc is acting on the metal, thus assisting the consumption of the same. Other oxygen developing materials for instance powdery substances may be applied to the cutting place to produce a similar effect.

If so desired a blower $h$ may be arranged on one or both sides of the disk in such way as to act on the electric arc to blow it along the line of the metal to be cut, thus preheating the metal along this line. The blower $h$ may be of any known description, for instance a magnetic blower, but it may also be adapted to blow air or oxygen in the same direction to produce a similar effect.

I claim:

1. A method for cutting metals by an electric current comprising, producing on the metal to be cut and along the line where it is to be severed a travelling fluctuating arc, the fluctuations including minor fluctuations following each other in rapid succession, and major fluctuations following each other in less rapid succesion.

2. An apparatus for cutting metals by an electric current, comprising, a disk, teeth along the edge of the disk, a gap in the edge of the disk, means to rotate the disk at a high speed, and means to produce an electric current and conduct it from the disk to the metal to be cut.

3. An apparatus for cutting metals by an electric current, comprising, a disk, teeth along the edge of the disk, a gap in the edge of the disk, means to rotate the disk at a high speed, and means to produce an electric current and conduct it from the disk to the metal to be cut, and teeth, being continued for a short distance along the sides of the disk.

4. A disk for electrically cutting metal, teeth provided in the edge of the disk and continued a distance along the side faces of the disk, and a gap in the edge of the disk, the gap being abrupt at one end and merging into the circumference of the disk at the other end.

5. An apparatus for cutting metals by an electric current comprising a disk having teeth on its edge, means to conduct an electric current to the disk, and a blower arranged to blow an electric arc between the disk and metal to be cut, along the line of the desired cut in the material.

6. A method for cutting metals by an electric current comprising, producing a rapidly fluctuating travelling electric arc, on the metal and along the line, to be cut, including applying a nongaseous substance capable of giving off oxygen upon heating, to the place where the electric arc takes effect.

7. An apparatus for cutting metals by an electric current, comprising, a disk, teeth along the edge of the disk, means to rotate the disk at a high speed, and means to produce an electric arc between the disk and the metal to be cut.

8. A method for cutting metal by an electric current by the aid of a cutting disk, comprising, producing on the metal to be cut along the line where it is to be cut, a travelling fluctuating arc between the metal and said disk.

9. A method for cutting metal by an electric current, comprising, producing on the metal to be cut and along the line where it is to be cut, a travelling fluctuating arc, the fluctuations of the arc following one another in rapid succession.

OSKAR FRITZ AMANDUS EMIL GRUMPELT.